US007701397B2

(12) United States Patent
Mori et al.

(10) Patent No.: US 7,701,397 B2
(45) Date of Patent: Apr. 20, 2010

(54) WIRELESS COMMUNICATION APPARATUS (75) Inventors: Kohei Mori, Kanagawa (JP); Takashi Mizoroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 11/347,344

(22) Filed: Feb. 3, 2006

(65) Prior Publication Data
US 2006/0183433 A1 Aug. 17, 2006

(30) Foreign Application Priority Data
Feb. 15, 2005 (JP) ............................ P2005-037979

(51) Int. Cl.
*H01Q 1/24* (2006.01)
(52) U.S. Cl. ..................... 343/702; 455/90.3
(58) Field of Classification Search .................. 343/702; 455/90.3
See application file for complete search history.

(56) References Cited

U.S. PATENT DOCUMENTS

| 4,920,352 | A | * | 4/1990 | Martensson et al. .......... 343/702 |
| 5,335,368 | A | * | 8/1994 | Tamura .................... 455/575.7 |
| 6,348,897 | B1 | * | 2/2002 | Alameh et al. .............. 343/702 |
| 7,180,452 | B2 | * | 2/2007 | Saito ........................ 343/702 |

FOREIGN PATENT DOCUMENTS

| JP | 63-176003 | 7/1988 |
| JP | 09-307330 | 11/1997 |
| JP | 11-186824 | 7/1999 |
| JP | 2002-271462 | 9/2002 |
| JP | 2003-133828 | 5/2003 |

* cited by examiner

*Primary Examiner*—HoangAnh T Le
(74) *Attorney, Agent, or Firm*—Robert J. Depke; Rockey, Depke & Lyons, LLC (57) ABSTRACT

The present invention provides a wireless communication apparatus that can maintain good and stable antenna characteristics, regardless of the change in the profile of the cabinet and that of the antenna element. The wireless communication apparatus includes a profile changeable cabinet adapted to changes its profile at least from a first cabinet profile to a second cabinet profile and vice versa and equipped with an antenna element, an antenna characteristics switching circuit section for selecting, in the profile changeable cabinet, the predetermined first antenna characteristic values specified for the first cabinet profile or the predetermined second antenna characteristic values specified for the second cabinet profile, and a cabinet profile detection unit that detects the change, if any, in the profile of the profile changeable cabinet from the first cabinet profile to the second cabinet profile or the other way round and outputting a detection signal for driving the antenna characteristics switching circuit section, the antenna characteristics switching circuit section being adapted to switch from the first antenna characteristic values to the second antenna characteristic values or the other way round according to the detection signal from the cabinet profile detecting unit in response to a change in the profile of the profile changeable cabinet.

4 Claims, 12 Drawing Sheets

WIRELESS COMMUNICATION APPARATUS

CROSS REFERENCES TO RELATED APPLICATIONS

The present invention contains subject matter related to Japanese Patent Application JP 2005-037979 filed in the Japanese Patent Office on Feb. 15, 2005, the entire contents of which being incorporated herein by reference.

BACKGROUND OF THE INVENTION

1. Field of the Invention

This invention relates to a wireless communication apparatus of a portable telephone set, a portable television receiving set or the like having an antenna element.

2. Description of the Related Art

Various wireless communication apparatus are equipped with an antenna device for radiating or absorbing an electric wave of a predetermined frequency band. For instance, in the current trend of phenomenally spreading portable telephone sets, they are taking a role of information terminal apparatus for transmitting/receiving e-mail letters and various images and exchanging information of different types rather than a role of simple gears for talking with others. Additionally, as broadcasting stations in Japan have started terrestrial digital transmission services, portable telephone sets are expected to take a new role of operating as television receiving sets in the near future.

In view of the above-identified circumstances, many portable telephone sets are currently equipped with a large liquid crystal display for the convenience of users and designed to appeal buyers particularly in terms of portability and uniqueness. In the field of portable telephone sets, so-called stick type telephone sets are giving way to foldable type telephone sets (denoted by 100) as shown in FIG. 1 and bendable type telephone sets (denoted by 110) as shown in FIG. 2.

Figure 1:
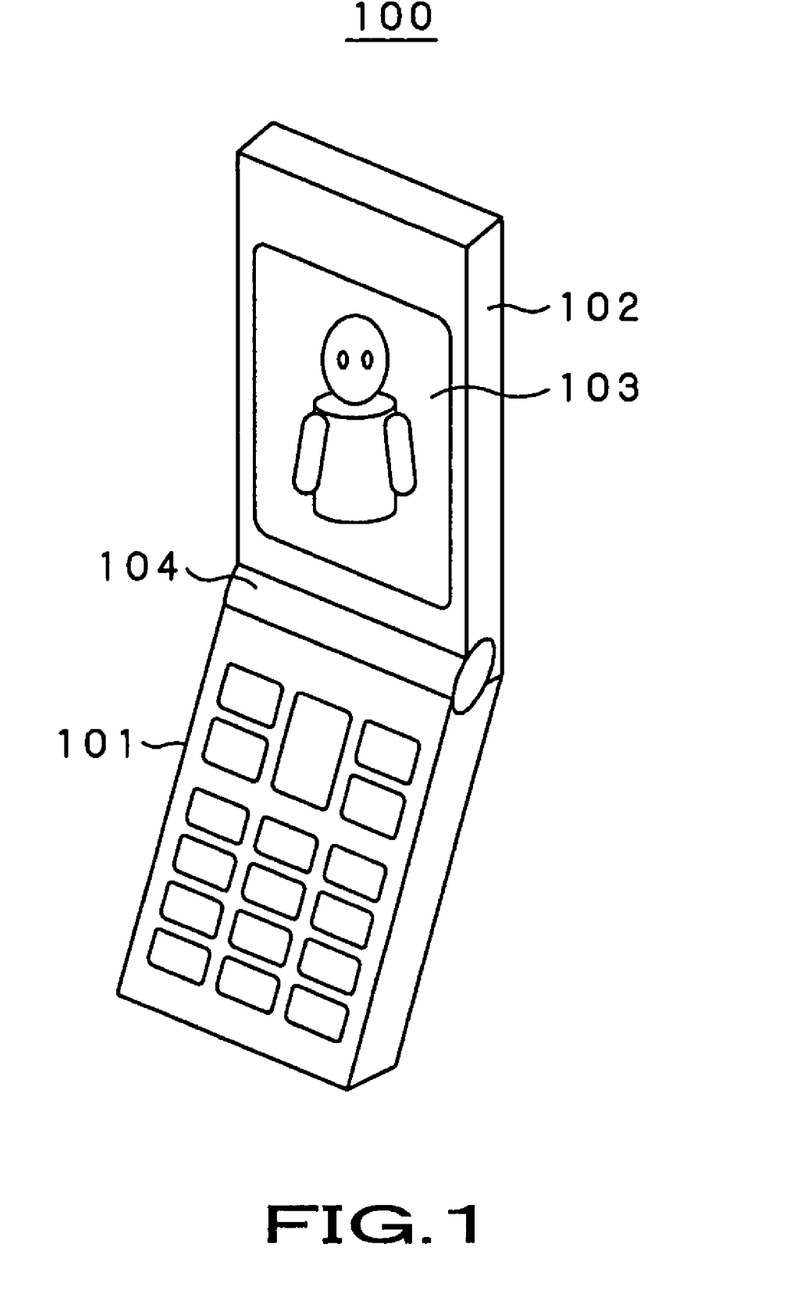
FIG. 1 is a schematic perspective view of a known foldable type portable telephone set.

Referring to FIG. 1, a foldable telephone set 100 includes two cabinets including a first cabinet 101 where an operation panel including ten keys and function buttons is arranged and a second cabinet 102 where a large liquid crystal display 103 is arranged. The first cabinet 101 and the second cabinet 102 are linked to each other by means of a hinge mechanism 104 so as be foldable relative to each other. When the user of a foldable telephone set 100 talks to some other person over the telephone, he or she unfolds the second cabinet 102 from the first cabinet 101 by way of the hinge mechanism 104 as shown in FIG. 1.

Figure 2:
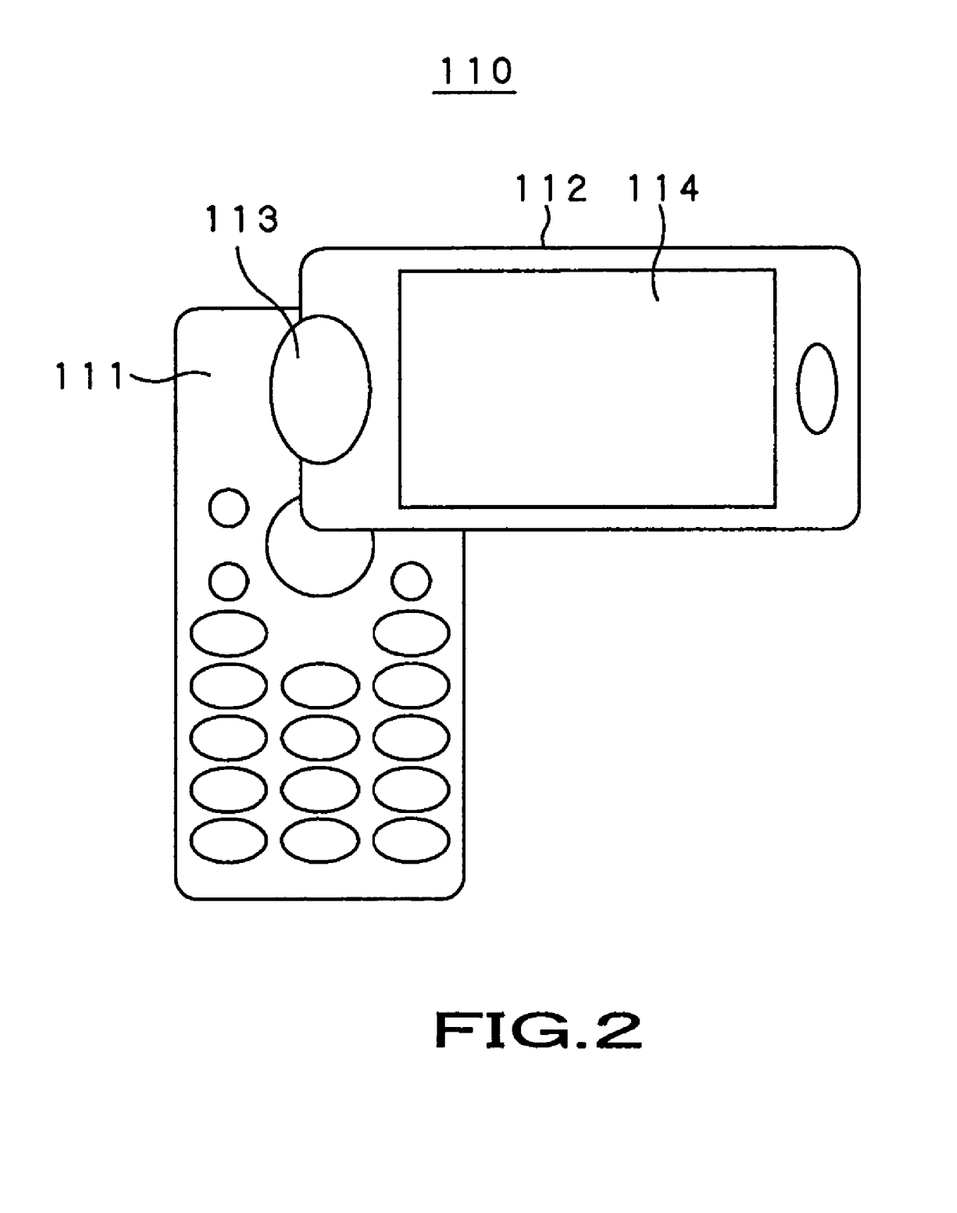
FIG. 2 is a schematic plan view of another known foldable type portable telephone set.

Referring to FIG. 2, a bendable portable telephone set 110 includes a first cabinet 111 and a second cabinet 112 that are linked to each other by way of a universal joint mechanism 113 so that they can be moved in three-dimensional directions relative to each other. With a bendable portable telephone set 110, it is possible for the user to turn the second cabinet 112 upside down relative to the first cabinet 111 so as to expose the liquid crystal display 114 to the surface side and bend the second cabinet 112 orthogonally relative to the first cabinet 111 by means of the universal joint mechanism 113. In this state, the operation panel on the first cabinet 111 and the liquid crystal display 114 on the second cabinet 112 face the same direction and the liquid crystal display 114 is arranged horizontally oblong so that the user can conveniently view a television program or some other video image.

Figure 3:
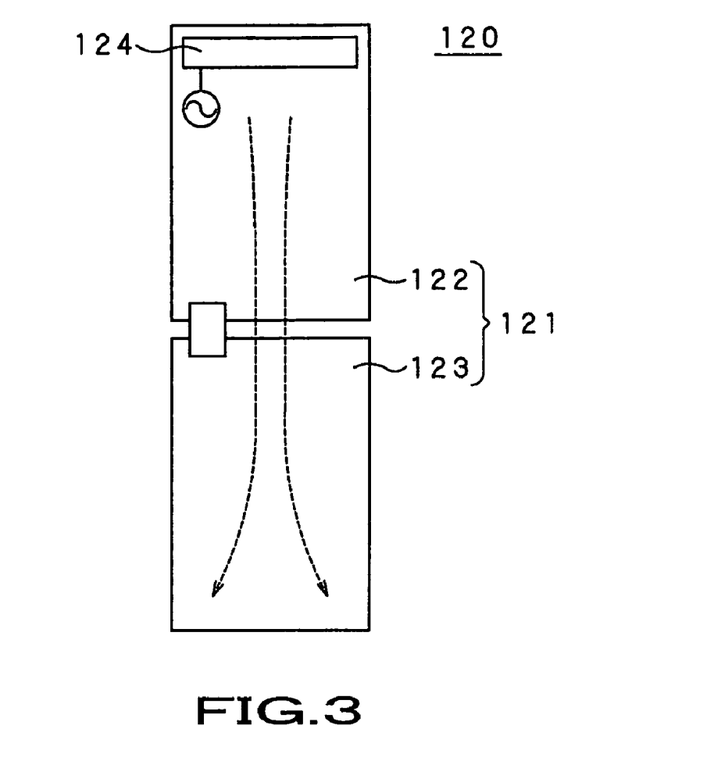
FIG. 3 is a schematic illustration of the antenna characteristics of a wireless communication apparatus in a state where the cabinet is unfolded.
Figure 4:
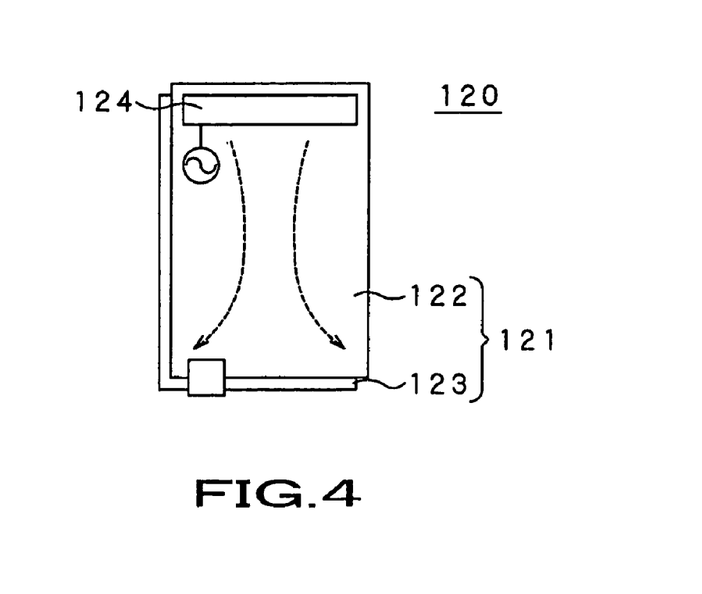
FIG. 4 is a schematic illustration of the antenna characteristics of the wireless communication apparatus of FIG. 3 in a state where the cabinet is folded.

Generally, various portable wireless communication apparatus 120 including portable telephone sets includes a cabinet 121 that includes a first cabinet 122 and a second cabinet 123 and the first cabinet 122 is equipped with an antenna element 124 as shown in FIGS. 3 and 4. As the cabinet 121 of the portable telephone set 120 is made to operate as ground line of the antenna apparatus, a high frequency electric current flows through the cabinet 121 as indicated by dotted lines in FIGS. 3 and 4.

In the portable telephone set 120, the input impedance of the antenna element 124 is set to a level that holds the antenna characteristics including the input characteristics and the gain of the antenna in the most efficient conditions by an impedance matching circuit. However, portable telephone sets 120 are accompanied by a problem that the optimized input impedance can be shifted to degrade the antenna characteristics as the cabinet 121 is held by hand by the user and the head of the user comes very close to the antenna element 124 when the user talks over the telephone. Techniques for coping with the problem are disclosed in Patent Document 1 (Jpn. Pat. Appln. Laid-Open Publication No. 2004-166191) and Patent Document 2 (Jpn. Pat. Appln. Laid-Open Publication No. 2004-208219).

Patent Document 3 (Jpn. Pat. Appln. Laid-Open Publication No. 2000-278024) discloses an antenna apparatus that can secure a predefined gain in the receiving frequency band when an object approaches the inverted F-type antenna element from around. The disclosed antenna apparatus includes an inverted F-type antenna element having a plurality of short-circuiting sections that correspond respectively to a plurality of different resonance frequencies and are arranged on a radiative conductor plate having a feed section, a detection means for detecting a state where the resonance frequency fall and a switching means for selecting a short-circuiting section from the plurality of short-circuiting section. When a human body or some other object approaches to make the resonance frequency fall in the antenna apparatus, a switching signal is output from the detection means to the switching means to select an appropriate short-circuiting section in order to prevent the gain from falling by raising the resonance frequency.

SUMMARY OF THE INVENTION

Meanwhile, a variety of forms are being used for the cabinets of portable telephone sets and a problem has been noticed in portable telephone sets that the antenna characteristics of portable telephone sets can be degraded depending on the change that can occur to the profile of the cabinet in addition to the above identified problem that the antenna characteristics can be degraded under the influence of a human body. A high frequency current flows through the cabinet of a portable telephone set as described above and hence the antenna characteristics can change remarkably when the cabinet is unfolded from a folded state and vice versa.

Thus, the antenna characteristics of the antenna element of a portable telephone set change while it is in use under the influence of a human body and due to a change in the profile of the cabinet and the antenna element itself. When a portable telephone set is operated for data communications, it is more often than not placed on a table and hence influenced by the electric conductors that are found around it. While portable telephone sets have been designed in such a way that their antenna characteristics can be exploited maximally when they are operated for a telephone call, they now face difficulties as they are made to operate multi-functionally and actually being used in a variety of operation modes in addition to that they come up with a variety of different profiles.

Additionally, it is expected that a variety of antennas of different types including dipole antennas, loop antennas, other structurally basic antennas, balancing feed antennas formed on the basis of structurally basic antennas and other antennas will selectively be used for portable telephone sets in response to the trend toward multi-mode and multi-function. Thus, antenna apparatus will be required to show antenna characteristics that can be exploited maximally in any environment. However, it is currently difficult to realize such antenna apparatus as will be appreciated from the above-identified circumstances.

Thus, it is therefore desirable to provide a wireless communication apparatus that can transmit and receive information reliably, while maintaining good and stable antenna characteristics, regardless of the change in the profile of the cabinet and that of the antenna element.

According to the present invention, there is provided a wireless communication apparatus including a cabinet, an antenna element arranged on the cabinet, an antenna characteristics switching circuit section for selecting optimal antenna characteristic values, and a profile detection means for detecting the change, if any, in the profile of the cabinet and the antenna element. Preferably, a wireless communication apparatus according to the invention includes a profile changeable cabinet that can change its profile from a first cabinet profile to a second cabinet profile and vice versa and/or a profile changeable antenna element that can change its profile from a first antenna profile to a second antenna profile and vice versa with respect to the cabinet. In a wireless communication apparatus according to the invention, the antenna characteristics switching circuit section selects first antenna characteristic values or second antenna characteristic values that are most efficient for the operation of the apparatus in the first profile or the second profile, whichever appropriate, of the cabinet and/or the antenna element. In a wireless communication apparatus according to the invention, the antenna characteristics switching circuit section selects predefined antenna characteristic values that are most efficient for the operation of the apparatus.

In a wireless communication apparatus according to the invention, it may be so arranged that a cabinet profile detection means detects a change in the first cabinet profile or the second cabinet profile of the profile changeable cabinet. Then, in a wireless communication apparatus according to the invention, the antenna characteristics switching circuit section switches from the preset first antenna characteristic values that are the most efficient for the operation of the apparatus in the first profile of the cabinet to the preset second antenna characteristic values that are most efficient for the operation of the apparatus in the second profile of the cabinet and vice versa according to the detection signal from the cabinet profile detection means.

In a wireless communication apparatus according to the invention, it may be so arranged that an antenna profile detection means detects a change in the first antenna profile or the second antenna profile of the profile changeable antenna element. Then, in a wireless communication apparatus according to the invention, the antenna characteristics switching circuit section switches from the preset first antenna characteristic values that are most efficient for the operation of the apparatus in the first profile of the antenna element to the preset second antenna characteristic values that are most efficient for the operation of the apparatus in the second profile of the antenna element and vice versa according to the detection signal from the antenna profile detection means.

In a wireless communication apparatus according to the invention, it may be so arranged that a cabinet/antenna profile detection means detects a change in the first cabinet profile or the second cabinet profile of the profile changeable cabinet or the first antenna profile or the second antenna profile of the profile changeable antenna element. Then, in a wireless communication apparatus according to the invention, the antenna characteristics switching circuit section switches from preset first cabinet characteristic values and the preset first antenna characteristic values that are most efficient for the operation of the apparatus in the first profile of the cabinet and in the first profile of the antenna element respectively to the preset second cabinet characteristic values and the preset second antenna characteristic values that are most efficient for the operation of the apparatus in the second profile of the cabinet and in the second profile of the antenna element respectively and vice versa according to the detection signal from the cabinet/antenna profile detection means.

In a wireless communication apparatus according to the invention, it may be so arranged that a cabinet/antenna profile detection means detects a change in the first cabinet profile or the second cabinet profile of the profile changeable cabinet or the first antenna profile or the second antenna profile of the profile changeable antenna element. Then, in a wireless communication apparatus according to the invention, the antenna characteristics switching circuit section operates for combining predefined antenna characteristic values according to the detection signal from the cabinet/antenna profile detection means.

Thus, with a wireless communication apparatus according to the invention, a profile detection means detects a change in the profile of the profile changeable cabinet and also in the profile of the profile changeable antenna element and the antenna characteristics switching circuit section is driven by the detection signal output from the profile detection means to maintain optimal antenna characteristic values. Then, it is possible to prevent difficulties degradation of the antenna characteristics due to changes in the profile of the cabinet and that of the antenna element that arise as the apparatus can be used with a variety of modes of operation and a variety of profiles.

DETAILED DESCRIPTION OF THE PREFERRED EMBODIMENTS

Figure 5:
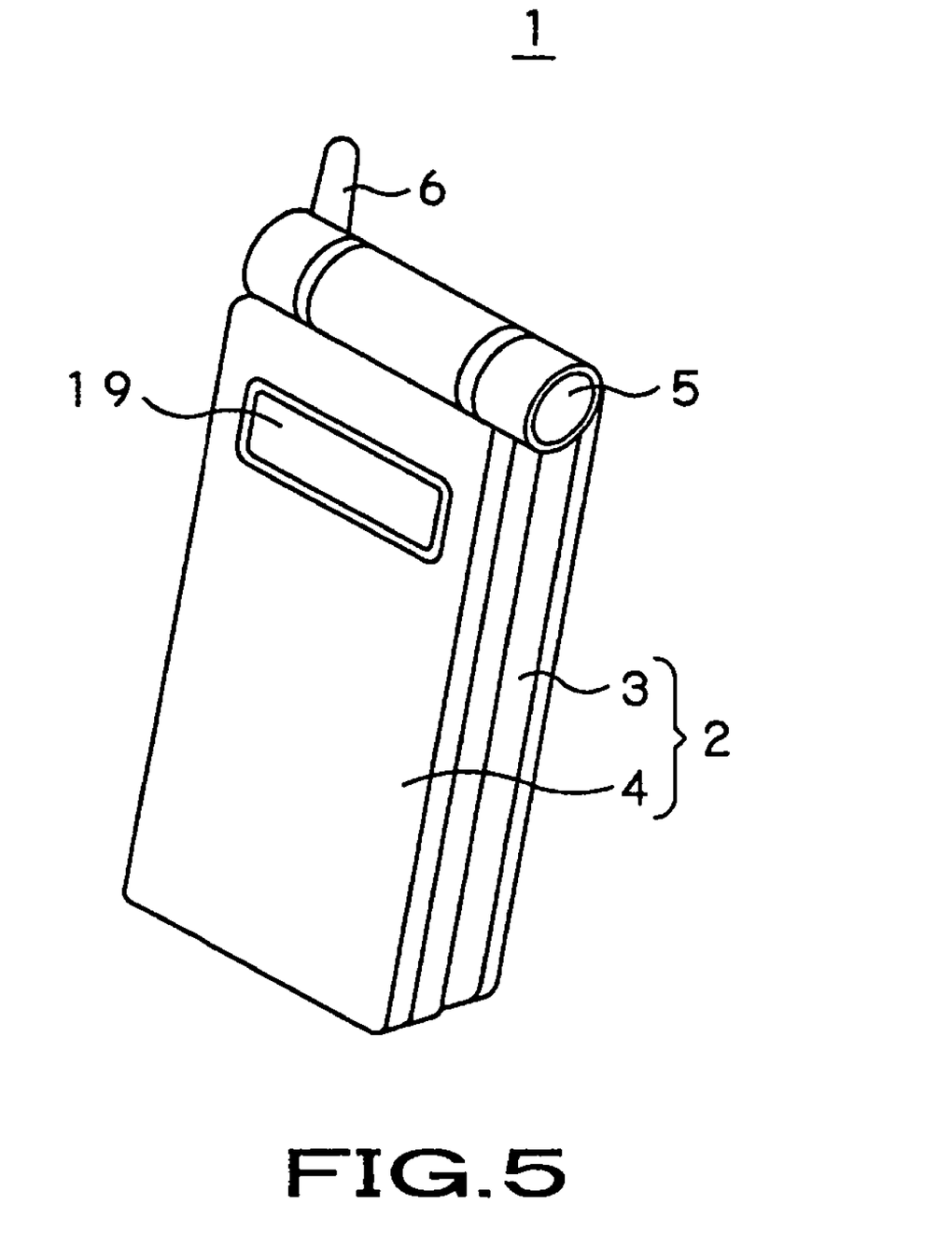
FIG. 5 is a schematic perspective view of a first embodiment of the present invention, which is a foldable type portable telephone set.
Figure 6:
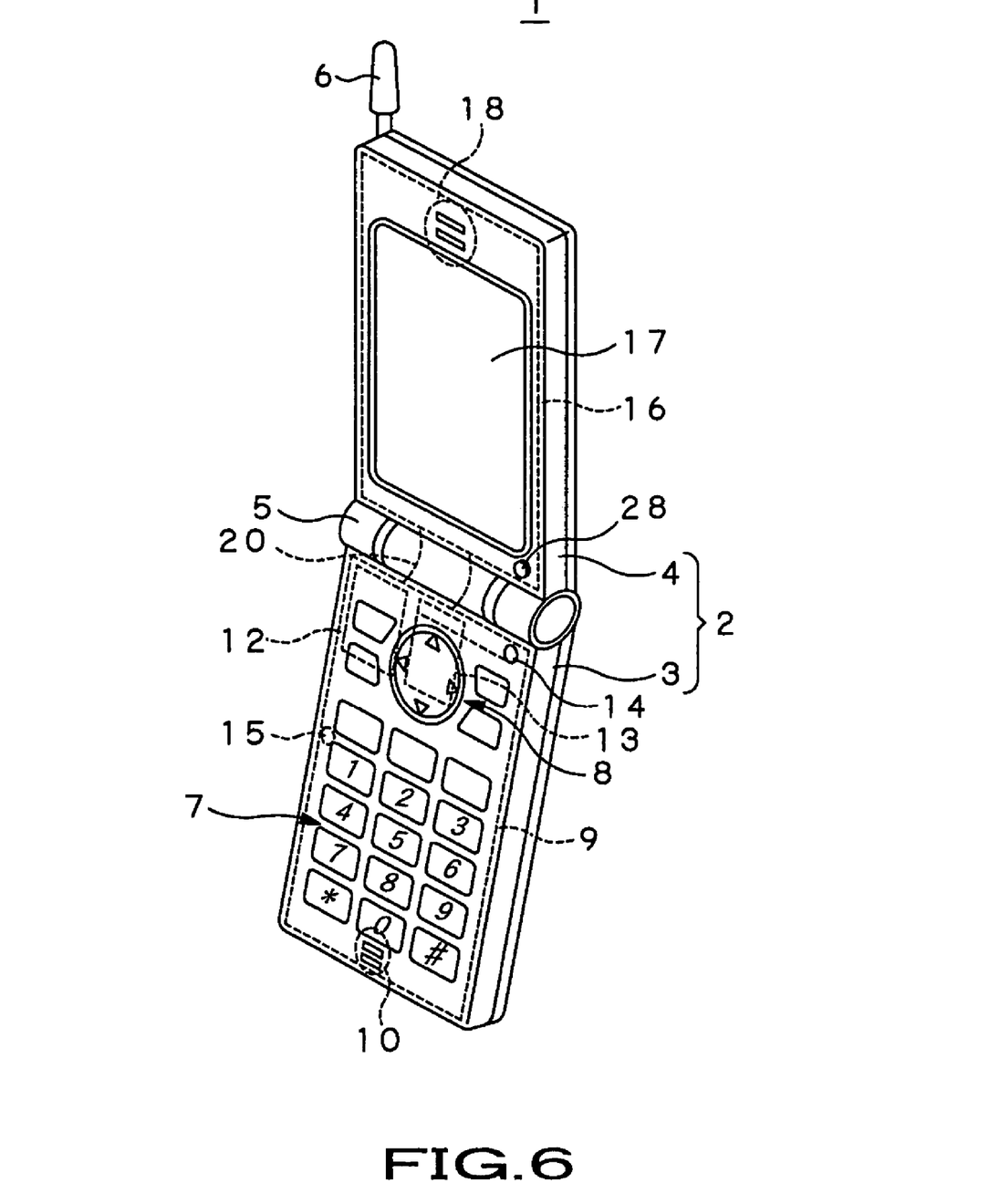
FIG. 6 is a schematic perspective view of the embodiment of FIG. 5 in a state where the cabinet is unfolded.
Figure 7:
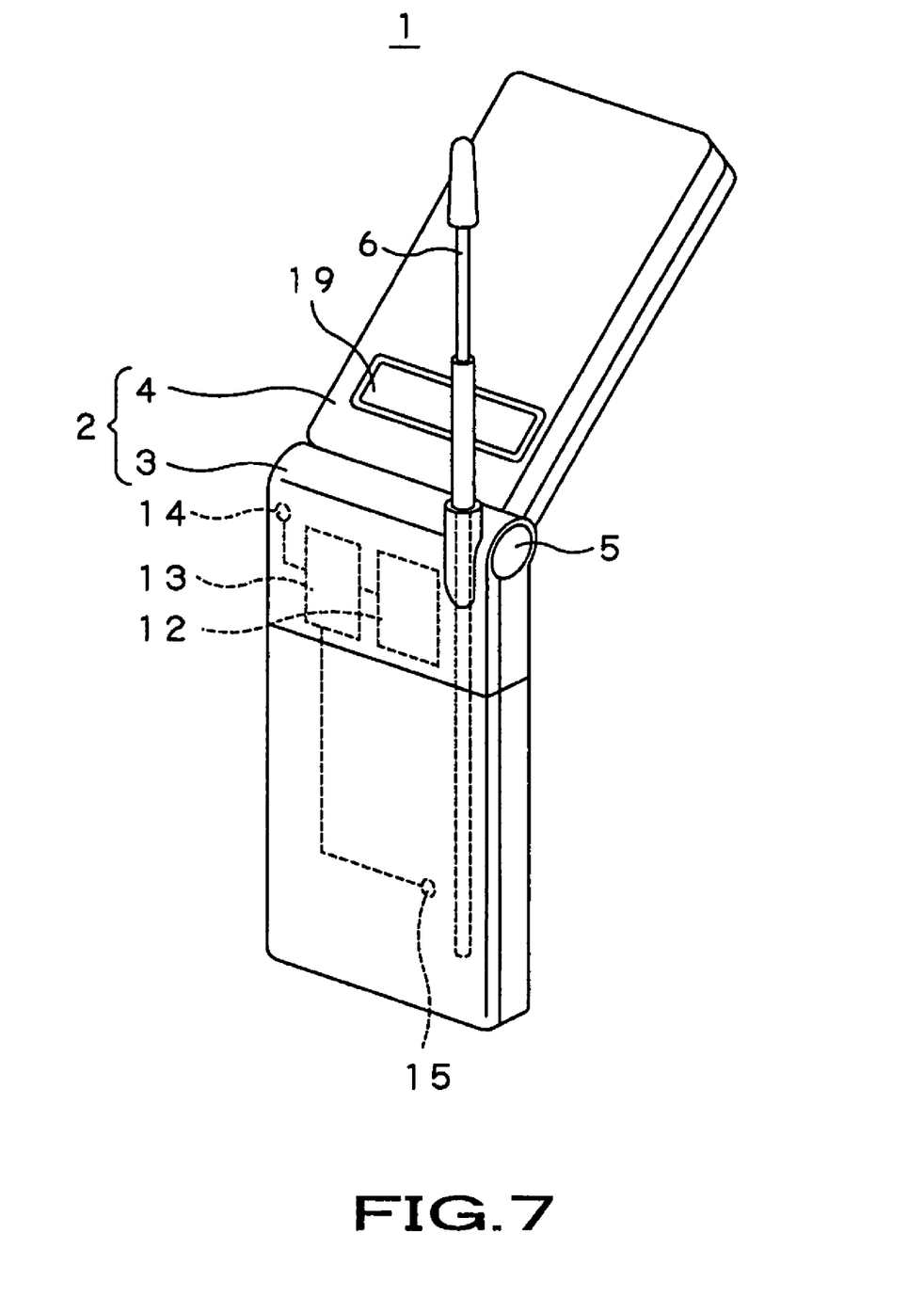
FIG. 7 is a schematic perspective rear view of the embodiment of FIG. 5 in a state where the antenna element is drawn out extended from the unfolded cabinet.

Now, the present invention will be described in greater detail by referring to the accompanying drawings that illustrate preferred embodiments of the present invention, which are portable telephone sets. FIGS. 5 through 8 illustrates the first embodiment of the invention, which is a portable telephone set 1. Referring to FIGS. 5 through 8, the portable telephone set 1 is a foldable type portable telephone set that includes a cabinet 2 that includes a first cabinet 3 and a second cabinet 4 that are rotatably connected to each other by means of a hinge mechanism 5, which is of a known type and hence will not be described in greater detail. The cabinet 2 of the portable telephone set 1 can selectively take a first cabinet profile where the second cabinet 4 is folded onto the first cabinet 3 as shown in FIG. 5 and a second cabinet profile where the second cabinet 4 is unfolded from the first cabinet 3 as shown in FIG. 6. The portable telephone set 1 also includes an antenna element 6, which is arranged at the side of the first cabinet 3 and can selectively take a first antenna profile where it is contained in the first cabinet 3 as shown in FIG. 5 and a second antenna profile where it is extended from the first cabinet 3 as shown in FIG. 7.

As shown in FIG. 6, the portable telephone set 1 is provided on the main surface thereof with ten keys 7 and various function buttons 8 and a first wiring substrate 9 is incorporated into the inside of the first cabinet 3. The first wiring substrate 9 is mounted with LSIs, ICs, various electronic parts and semiconductor memory elements that constitute a wireless transmission/reception circuit module, a dialing call originating circuit module, a power supply circuit, a character conversion module and so on. The first wiring substrate 9 is also mounted with a microphone 10 that is arranged near the end of the side thereof remote from the hinge mechanism 5 and located vis-à-vis a sound collecting hole arranged at the first cabinet 3. The first cabinet 3 contains in the inside thereof a battery that is covered by a lid arranged at the rear side of the first cabinet 3 and adapted to be freely opened and closed. Although not shown, the first cabinet 3 is provided at the front side facet thereof with terminals for charging the battery, connectors for external connections and the like.

The portable telephone set 1 is provided with a front end feed type whip antenna that is based on a ½ wave dipole antenna and extendably/contractably contained in an antenna case arranged at the top end of the first cabinet 3, which antenna case will not be described in greater detail. Note that the antenna element 6 is not limited to a ½ wave antenna element but may alternatively be a ¼ wave antenna element or a ⅝ wave antenna element and may be dimensionally reduced by using a meandering type or a helical type profile. The portable telephone set 1 is equipped with an antenna that typically is a chip antenna, plate antenna or a patch antenna mounted on the first wiring substrate 9 and the electric wave of the incoming signal is received exclusively by the contained antenna.

In the portable telephone set 1, a ground conductor section 11 of the antenna element 6 is formed by using a ground pattern typically formed on the main surface of the first wiring substrate 9 or a metal chassis combined with the first cabinet 3 so as to show a predetermined area that corresponds to the applicable frequency band. Of the portable telephone set 1, the cabinet 3 changes its profile between the first cabinet profile and the second cabinet profile as described above and at the same time the antenna element 6 changes its profile between the first antenna profile and the second antenna profile.

The antenna characteristics of the portable telephone set 1 change according to the change in the profile of the cabinet 2 and also to the change in the profile of the antenna element 6. Since a high frequency electric current also flows through the cabinet 2 where the ground conductor section 11 is formed, the effective antenna length that utilizes the image current flowing through the cabinet 2 is reduced in equivalent terms when the second cabinet 4 is folded onto the first cabinet 3. Similarly, the antenna characteristics of the portable telephone set 1 change according to the change in the length of the antenna element 6.

The portable telephone set 1 includes a characteristics switching circuit section for switching the antenna characteristics by changing the reactance by tuning and switching the inductance, the capacitance and the like. In the portable telephone set 1, the characteristics switching circuit section is typically formed by using an impedance matching switching circuit section 12 arranged on the first wiring substrate 9. The portable telephone set 1 additionally includes a voltage supply circuit section 13 for supplying a voltage value of a predetermined level to the impedance matching switching circuit section 12 on the first wiring substrate 9. The portable telephone set 1 further includes a cabinet profile detecting section 14 for detecting a change in the profile of the cabinet 2 and an antenna processing detecting section 15 for detecting a change in the profile of the antenna element 6, which are arranged in the first cabinet 3. In the portable telephone set 1, detection signals are output from the cabinet profile detecting section 14 and the antenna profile detecting section 15 to the voltage supply section 13.

The impedance matching switching circuit 12 is arranged on the first wiring substrate 9 and connected to the antenna element 6, the wireless transmission/reception circuit module or the ground conductor section 11. As a voltage of a predetermined level is supplied to the impedance matching switching circuit section 12 from the voltage supply section 13 according to the detection signals output from the cabinet profile detecting section 14 and the antenna profile detecting section 15, the impedance matching switching circuit section 12 operates for switching to the input impedance that makes the antenna characteristics including the input characteristic and the gain most efficient in the applicable frequency band by means of the antenna element having a predetermined length and the ground conductor having a predetermined area regardless of the change in the profile of the cabinet 2 and the change in the profile of the antenna element 6.

More specifically, when the cabinet 2 shows the first cabinet profile and at the same time the antenna element 6 shows the first antenna profile, the impedance matching switching circuit section 12 selects the input impedance for producing the first antenna characteristic values that make the antenna characteristics operate most efficiently for the portable telephone set 1. When the cabinet 2 shows the second cabinet profile and at the same time the antenna element 6 shows the first antenna profile, the impedance matching switching circuit section 12 selects the input impedance for producing the second antenna characteristic values that make the antenna characteristics operate most efficiently for the portable telephone set 1.

When the cabinet 2 shows the first cabinet profile and at the same time the antenna element 6 shows the second antenna profile, the impedance matching switching circuit section 12 selects the input impedance for producing the third antenna characteristic values that make the antenna characteristics operate most efficiently for the portable telephone set 1. Finally, when the cabinet 2 shows the second cabinet profile and at the same time the antenna element 6 shows the second antenna profile, the impedance matching switching circuit section 12 selects the input impedance for producing the fourth antenna characteristic values that make the antenna characteristics operate most efficiently for the portable telephone set 1.

For example, as the cabinet profile detecting section 14 detects a change in the profile of the cabinet 2 from the first cabinet profile where the second cabinet 4 is folded onto the first cabinet 3 to the second cabinet profile where the second cabinet 4 is unfolded from the first cabinet 3 by way of the hinge mechanism 5, it outputs a first cabinet detection signal to the voltage supply circuit section 13. Similarly, as the cabinet parallel detecting section 14 detects a change in the profile of the cabinet 2 from the second cabinet profile to the first cabinet profile where the second cabinet 4 is folded onto the first cabinet 3, it outputs a second cabinet detection signal to the voltage supply circuit section 13.

Likewise, as the antenna profile detecting section 15 detects a change in the profile of the antenna element 6 from the first antenna profile where the antenna element 6 is contained in the first cabinet 3 to the second antenna profile where the antenna element 6 is drawn out, it outputs a first antenna detection signal to the voltage supply circuit section 13. Similarly, as the antenna profile detecting section 15 detects a change in the profile of the antenna element 6 from the second antenna profile to the first antenna profile where the antenna element 6 is pushed into the first cabinet 3, it outputs a second antenna detection signal to the voltage supply circuit section 13.

As the first cabinet detection signal and the first antenna detection signal are input to the voltage supply circuit section 13 from the cabinet profile detecting section 14 and the antenna profile detecting section 15 respectively, the voltage supply circuit section 13 supplies a first level voltage that provides the first antenna characteristic values to the impedance matching switching circuit section 12. As the second cabinet detection signal and the first antenna detection signal are input to the voltage supply circuit section 13 from the cabinet profile detecting section 14 and the antenna profile detecting section 15 respectively, the voltage supply circuit section 13 supplies a second level voltage that provides the second antenna characteristic values to the impedance matching switching circuit section 12.

As the second cabinet detection signal and the first antenna detection signal are input to the voltage supply circuit section 13 from the cabinet profile detecting section 14 and the antenna profile detecting section 15 respectively, the voltage supply circuit section 13 supplies a third level voltage that provides the third antenna characteristic values to the impedance matching switching circuit section 12. As the second cabinet detection signal and the second antenna detection signal are input to the voltage supply circuit section 13 from the cabinet profile detecting section 14 and the antenna profile detecting section 15 respectively, the voltage supply circuit section 13 supplies a fourth level voltage that provides the fourth antenna characteristic values to the impedance matching switching circuit section 12.

The portable telephone set 1 further includes a second wiring substrate 16 arranged in the second cabinet 4. As shown in FIG. 6, a large first liquid crystal display 17 and a driver unit for driving the first liquid crystal display 17 are mounted in an opening section arranged at the main surface side of the second cabinet 4 with the display screen of the first liquid crystal display 17 exposed to the outside. A speaker 18 is also mounted on the second wiring substrate 16 at a position near the end of the side thereof remote from the hinge mechanism 6 and the sound emitting section thereof is located vis-à-vis the sound collecting hole arranged at the first cabinet 3. As shown in FIG. 5, a small second liquid crystal display 19 is mounted in an opening section arranged at the rear surface of the second cabinet 4 with the display screen of the second liquid crystal display 19 exposed to the outside. It may be needless to say that, if appropriate, one or more than one additional mechanism such as a CCD camera mechanism may also be mounted in the first cabinet 3 and/or the second cabinet 4.

The portable telephone set 1 additionally includes a flexible printed circuit board 20 that extends over the hinge mechanism 5 to electrically connect the first wiring substrate 9 in the first cabinet 3 and the second wiring substrate 16 in the second cabinet 4, although it will not be described in greater detail here. Thus, in the portable telephone set 1, the components in the first cabinet 3 and those in the second cabinet 4 operate in a concerted manner as various control signals are exchanged between the first wiring substrate and the second wiring substrate by way of the flexible printed circuit board 20 along with power.

Figure 8:
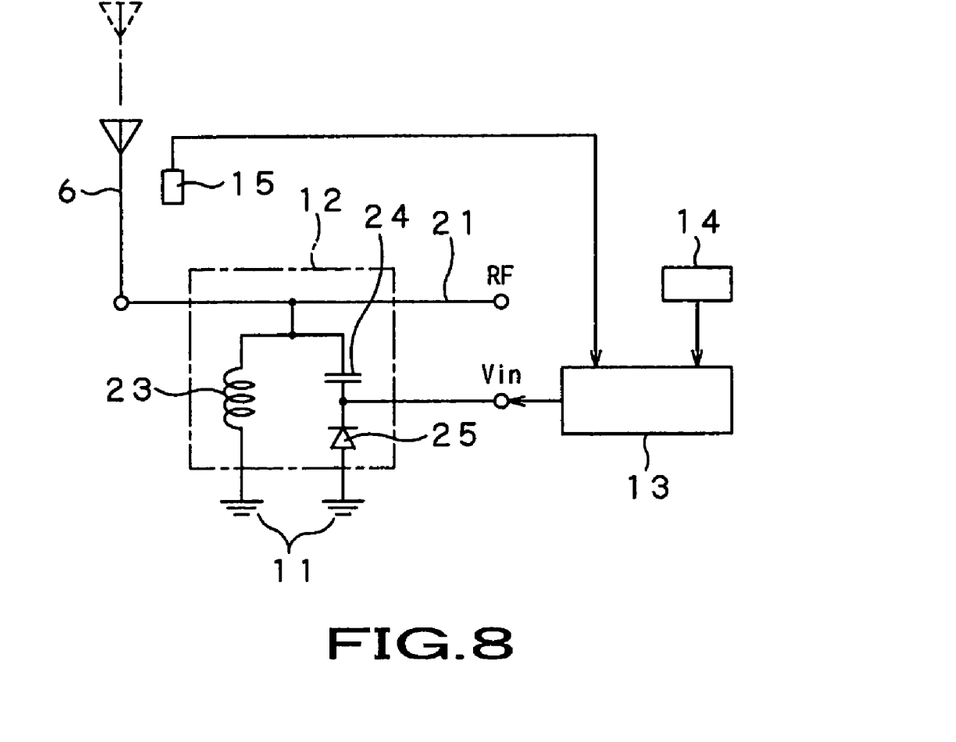
FIG. 8 is a schematic circuit diagram of an impedance matching switching circuit section of a characteristics switching section.

FIG. 8 is a schematic circuit diagram that can be used for the impedance matching switching circuit section 12 of the portable telephone set 1. The impedance matching switching circuit section 12 is connected to a high frequency signal line 21 that is connected to the antenna element 6 and operates for switching the input impedance so as to provide the selected one of the first through fourth sets of antenna characteristic values by means of the voltage supplied from the voltage supply section 13 according to the detection signals output from the cabinet profile detecting section 14 and the antenna profile detecting section 15.

The impedance matching switching circuit section 12 has a coil 23 that is connected at an end thereof to the high frequency signal line 21 and at the other end thereof to the ground conductor section 11 that is formed by the ground pattern arranged on the main surface of the first wiring substrate 9 or the metal chassis combined with the first cabinet 3 as described above. The impedance matching switching circuit section 12 has a capacitor 24 of a predetermined capacity that is connected at an end thereof to the high frequency signal line 21 and a varicap diode 25 connected at an end thereof to the capacitor 24 and at the other end to the ground conductor section 11.

As a voltage of a predetermined level supplied from the voltage supply circuit section 13 is applied between the capacitor 24 and the varicap diode 25 of the impedance matching switching circuit section 12, the high frequency signal line 21 is held to a predetermined input impedance level that provides the selected one of the first through fourth sets of antenna characteristic values.

Figure 9:
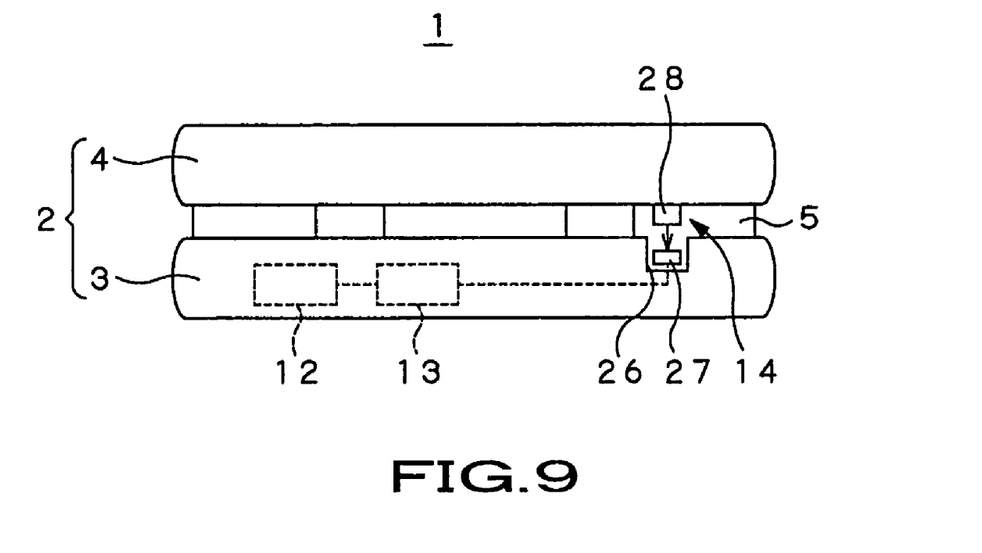
FIG. 9 is a schematic illustration of a cabinet profile detecting section, showing the configuration thereof.

The portable telephone set 1 includes the cabinet profile detecting section 14 typically having a configuration as shown in FIG. 9. The cabinet profile detecting section 14 includes a switch 27 arranged in a small hole 26 that is bored from the main surface of the first cabinet 3 and a small projection 28 formed on the main surface of the second cabinet 4 and arranged vis-à-vis the switch 27. The cabinet profile detecting section 14 performs a switching operation as the second cabinet 4 is folded onto the first cabinet 3 and the switch 27 is depressed by the projection 28 or as the second cabinet 4 is unfolded from the first cabinet 3 and the switch 27 is released from the depressed state by the projection 28.

The switching mechanism for supplying power to the first liquid crystal display 17 when the cabinet is unfolded that is of the type being employed popularly in existing foldable type portable telephone sets may also be used to operate for the cabinet profile detecting section 14. While an appropriate switch such as a tact switch or a piezoelectric switch is used for the switch 27 of the cabinet profile detecting section 14, it does not affect the characteristics of the antenna. If the portable telephone set is a foldable type portable telephone set having a universal joint mechanism, the cabinet profile detecting section 14 may be realized by using a switching mechanism that is adapted to supply power when the cabinet is unfolded. However, it may be needless to say that the cabinet profile detecting section 14 can be realized by using an independent switching mechanism.

The antenna profile detecting section 15 of the portable telephone set 1 is realized by using an appropriate switch such as a tact switch or a piezoelectric switch arranged vis-à-vis the antenna case of the first cabinet 3, although it will not be described in greater detail. The antenna element 6 depresses the switch when it is contained in the antenna case and releases the depressed state of the switch when it is drawn out from the antenna case. Thus, the antenna element 6 performs switching operations in this way. It may be needless to say that the antenna profile detecting section 15 does not affect the characteristics of the antenna.

Thus, of the portable telephone set 1, the cabinet 2 changes its profile as the second cabinet 4 is folded or unfolded relative to the first cabinet 3 and the antenna element 6 also changes its profile as it is contained into or drawn out from the antenna case. Then, in the portable telephone set 1, the change in the profile of the cabinet 2 and the change in the profile of the antenna element 6 are detected respectively by the cabinet profile detecting section 14 and the antenna profile detecting section 15. Of the portable telephone set 1, the voltage supply circuit section 13 is driven to operate according to the detecting signals output from the cabinet profile detecting section 14 and the antenna profile detecting section 15.

In the portable telephone set 1, a voltage of a predetermined level is supplied from the voltage supply circuit section 13 to the impedance matching switching circuit section 12 to switch the input impedance. In the portable telephone set 1, the antenna characteristics including the input characteristics and the gain of the antenna are held in the most efficient conditions in the applicable frequency band regardless of the change in the profile of the cabinet 2 and the change in the profile of the antenna element 6, if any, so that wireless communications may always take place in good and stable conditions. Thus, the portable telephone set 1 is adapted to operate for transmission and reception of signals in good and stable conditions, holding the antenna characteristics in a most efficient way, so as to eliminate any possible degradation of the antenna characteristics that can occur in the current trend toward multi-mode and multi-function as well as design variations, if the profile of the cabinet and that of the antenna element change.

While a voltage of a predetermined level is supplied from the voltage supply circuit section 13 to the impedance matching switching circuit section 12 according to the detection signals output from the cabinet profile detecting section 14 and the antenna profile detecting section 15 of the above-described portable telephone set 1 in the above description, the present invention is by no means limited thereto. The cabinet 2 and the antenna element 6 of the portable telephone set 1 can show only two different profiles and it is possible to define the most efficient antenna characteristic values in each of the profiles.

Therefore, it is only necessary to control the operation of the impedance matching switching circuit section 12 by means of an appropriate technique so as to provide the most efficient antenna characteristics according to the detection signals from the cabinet profile detecting section 14 and the antenna profile detecting section 15 of the portable telephone set 1. Alternatively, initial antenna characteristic values that can provide the most efficient antenna characteristics may be defined for the portable telephone set 1 and the operation of the voltage supply circuit section 13 and that of the impedance matching switching circuit section 12 may be controlled according to the detection signals output from the cabinet profile detecting section 14 and the antenna profile detecting section 15 so as to make the antenna characteristic values to be held to the initial antenna characteristic values.

Figure 10:
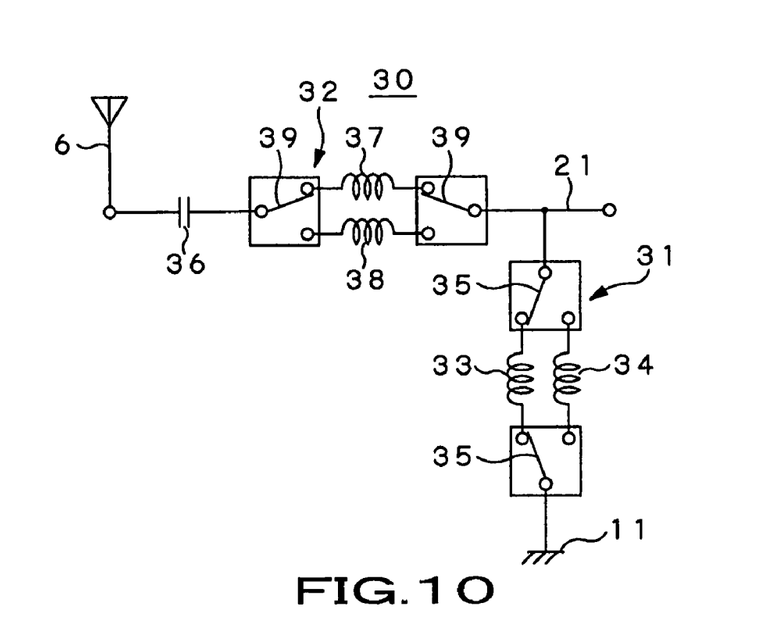
FIG. 10 is a schematic circuit diagram of a characteristics switching section that can also be used for the embodiment of FIG. 5.

A portable telephone set 1 according to the invention may be so arranged that it includes a characteristics switching circuit section 30 as shown in FIG. 10 that operates to select appropriate antenna characteristic values in response to a change in the profile of the cabinet 2 and/or a change in the profile of the antenna element 6. With this arrangement, the characteristics switching circuit section 30 includes a cabinet profile detecting section 31 and an antenna profile detecting section 32 that correspond respectively to the cabinet profile detecting section 14 and the antenna profile detecting section 15, which are described above. In the characteristics switching circuit section 30, the cabinet profile detecting section 31 is connected between a high frequency signal line 21 and a ground conductor section 11 and adapted to select either the first coil 33 or the second coil 34 of different characteristics by means of a two-circuit type cabinet profile detecting switch 35. In the characteristics switching circuit section 30, the antenna profile detecting section 15 is connected between the high frequency signal line 21 and a capacitor 36 and adapted to select either the first coil 37 and the second coil 38 of different characteristics by means of a two-circuit type antenna profile detecting switch 39.

Thus, in the characteristics switching circuit section 30, it is possible to provide four circuits having different circuit constants by combining the capacitor 36, the first coil 33 or the second coil 34 at the side of the cabinet profile detecting section 31 and the first coil 37 or the second coil 38 at the side of the antenna profile detecting section 32 and select one of the four circuits to produce first through fourth sets of antenna characteristic values. The characteristics switching circuit section 30 can select one of the first through fourth sets of antenna characteristic values by means of the switching operation of the cabinet profile detecting switch 35 and/or that of the antenna profile detecting switch 39 in response to a change in the profile of the cabinet 2 and/or a change in the profile of the antenna element 6, whichever appropriate. Thus, in the portable telephone set 1, the antenna characteristics including the input characteristics and the gain of the antenna are held in the most efficient conditions in the applicable frequency band so that wireless communications may always take place in good and stable conditions.

Figure 11:
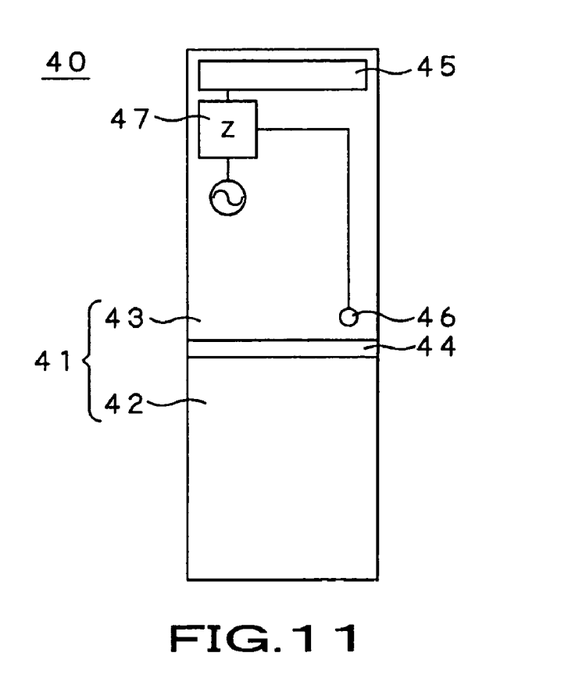
FIG. 11 is a schematic plan view of a second embodiment of the present invention, which is a portable telephone set, showing the configuration thereof.

FIG. 11 is a schematic plan view of the second embodiment of the present invention, which is also a portable telephone set 40, showing the configuration thereof. The portable telephone set 40 also includes a foldable cabinet 41 formed by combining a first cabinet 42 and a second cabinet 43 by means of a hinge mechanism 44 and can show a change in the profile from a first profile where the second cabinet 43 is folded onto the first cabinet 42 to a second profile where the second cabinet 43 is unfolded from the first cabinet 42 and vice versa. The portable telephone set 40 contains an antenna element 45 typically in a state where the latter is secured to the second cabinet 43.

The portable telephone set 40 includes a cabinet profile detecting section 46 for detecting a change in the profile of the cabinet 41 between the first cabinet profile and the second cabinet profile and a characteristics switching circuit section 47. Thus, in the portable telephone set 40, the cabinet profile detecting section 46 detects either the first cabinet profile or the second cabinet profile of the cabinet 41 and outputs a first detection signal or a second detection signal, whichever appropriate. Then, in the portable telephone set 40, the characteristics switching circuit section 47 operates to switch from the first antenna characteristic values to the second antenna characteristic values or the other way round according to the first detection signal or the second detection signal so that the portable telephone set 40 may operate with the most efficient antenna characteristics.

Since the antenna element 45 of the portable telephone set 40 is contained in the second cabinet 43, it is not necessary to provide the portable telephone set 40 with an antenna profile detecting section for detecting a change in the profile of the antenna element 45. It may be needless to say that, in the portable telephone set 40, the cabinet profile detecting section 46 may have a configuration similar to that of the cabinet profile detecting section 14 of the above-described portable telephone set 1 and the characteristics switching circuit section 47 may be formed by an impedance matching switching circuit section 12 and a voltage supply circuit section 13.

Figure 12:
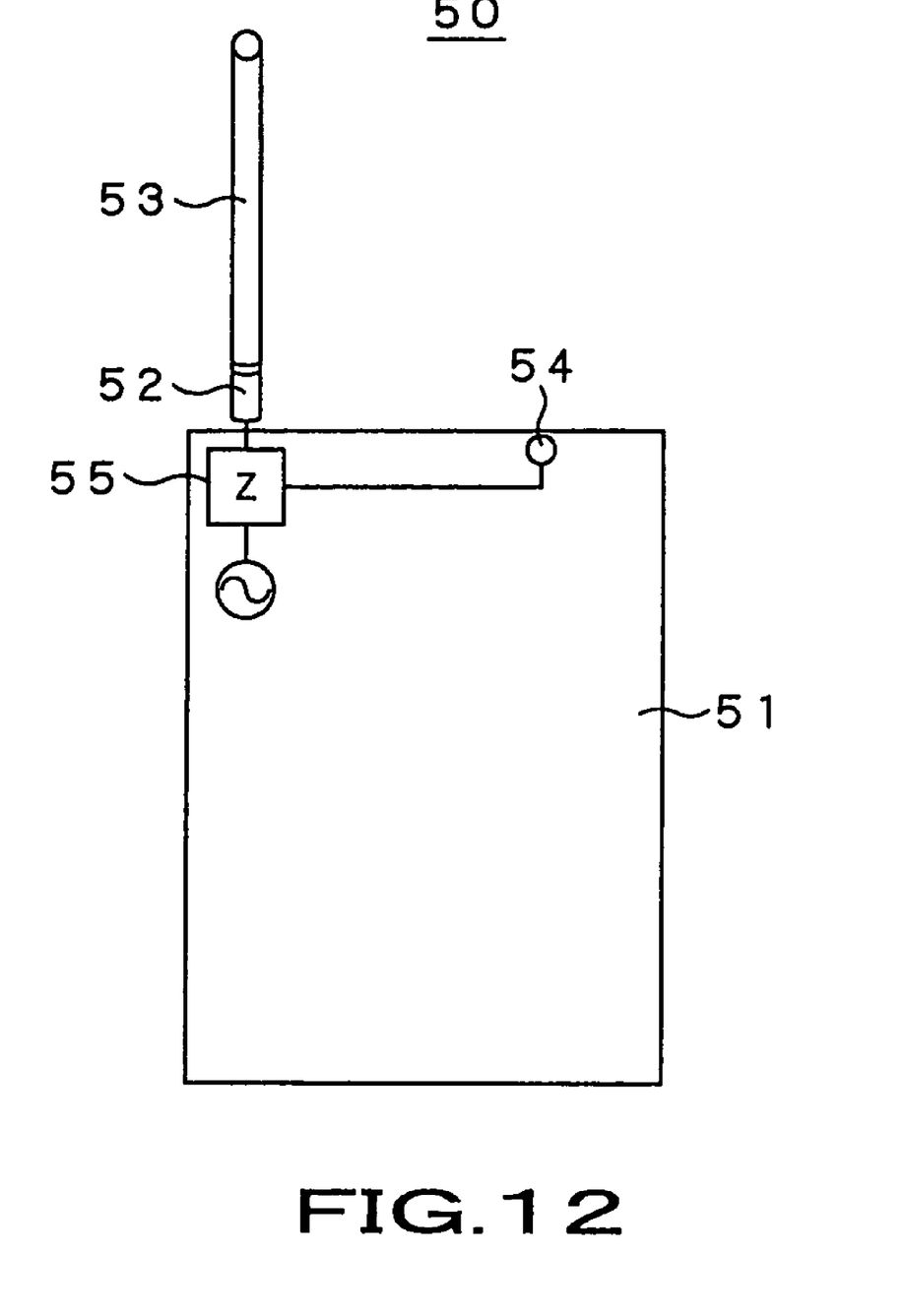
FIG. 12 is a schematic plan view of a third embodiment of the present invention, which is also a portable telephone set with its antenna element vertically extended.
Figure 13:
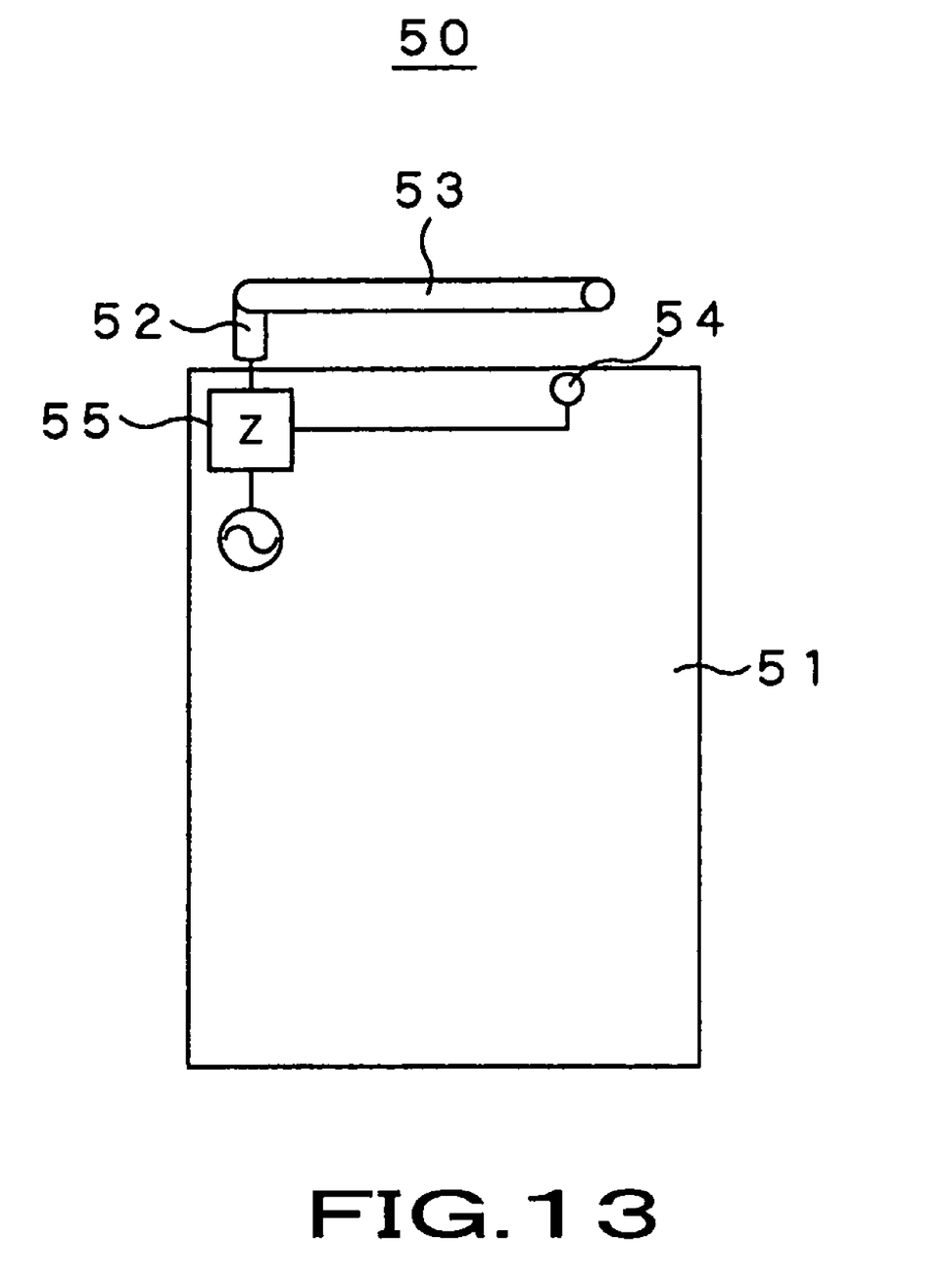
FIG. 13 is a schematic plan view of the third embodiment of FIG. 12 with its antenna element horizontally extended.

FIGS. 12 and 13 schematically illustrate the third embodiment of the present invention, which is also a portable telephone set 50. The portable telephone set 50 includes an antenna element 53 that is supported at an end thereof by a hinge member 52 arranged on the top surface of the cabinet 51 thereof so that the antenna element 53 can turn around the hinge member 52. The portable telephone set 50 can efficiently transmit/receive a vertically polarized communication wave when the antenna element 53 shows a first antenna profile where it stands upright relative to the cabinet 51 as shown in FIG. 12. The portable telephone set 50 can efficiently transmit/receive a horizontally polarized communication wave when the antenna element 53 shows a second antenna profile where it is held in parallel with the top surface of the cabinet 51 as shown in FIG. 13.

The portable telephone set 50 includes an antenna profile detecting section 54 for detecting a change in the profile of the antenna element 53 between the first antenna profile and the second antenna profile and a characteristics switching circuit section 55. Thus, in the portable telephone set 50, the antenna profile detecting section 54 detects either the first antenna profile or the second antenna profile of the antenna element 53 and outputs a first detection signal or a second detection signal, whichever appropriate. Then, in the portable telephone set 50, the characteristics switching circuit section 55 operates to switch from the first antenna characteristic values to the second antenna characteristic values or the other way round according to the first detection signal or the second detection signal so that the portable telephone set 50 may operate with the most efficient antenna characteristics.

Since the cabinet 51 of the portable telephone set 50 is of a single cabinet type, it is not necessary to provide the portable telephone set 50 with a cabinet profile detecting section for detecting a change in the profile of the cabinet 51. If the cabinet 51 of the portable telephone set 50 is of a separate cabinet type, the portable telephone set 50 is provided with a cabinet profile detecting section to control the characteristics switching circuit section 55.

Figure 14:
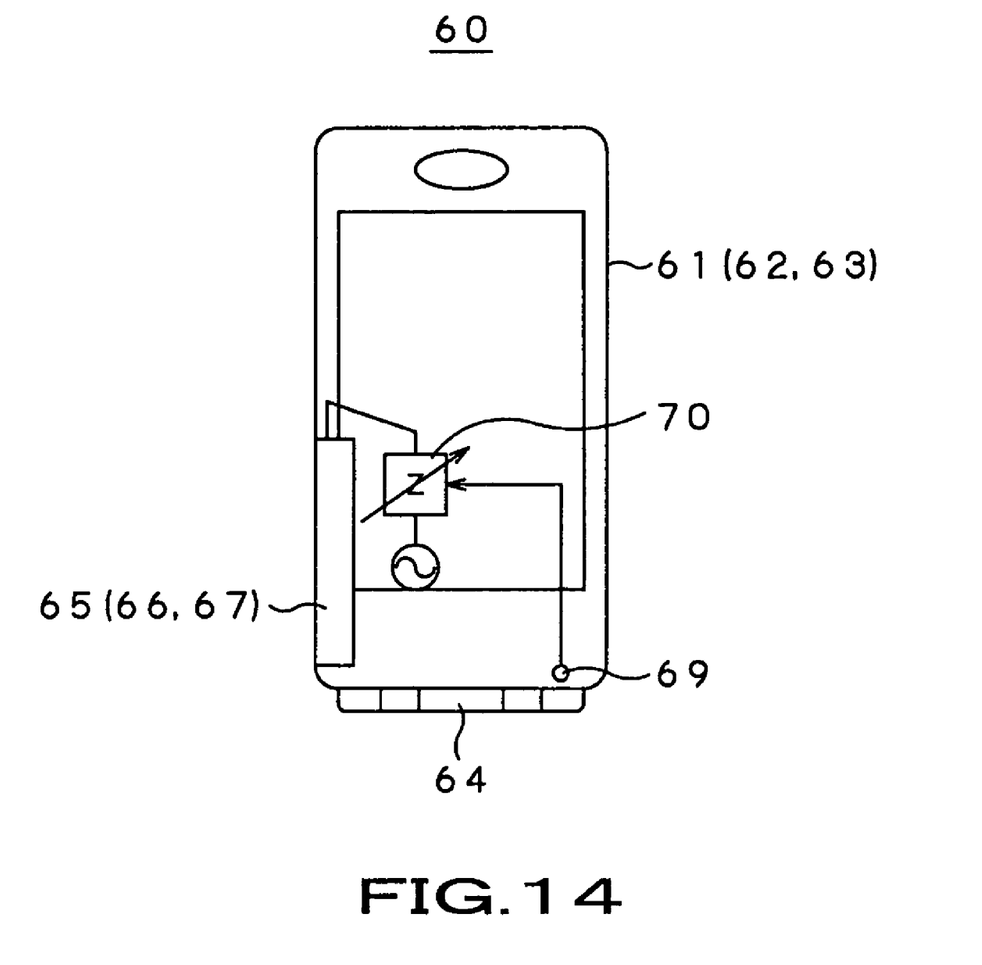
FIG. 14 is a schematic plan view of a fourth embodiment of the present invention, which is also a portable telephone set in a state where the cabinet is folded.
Figure 15:
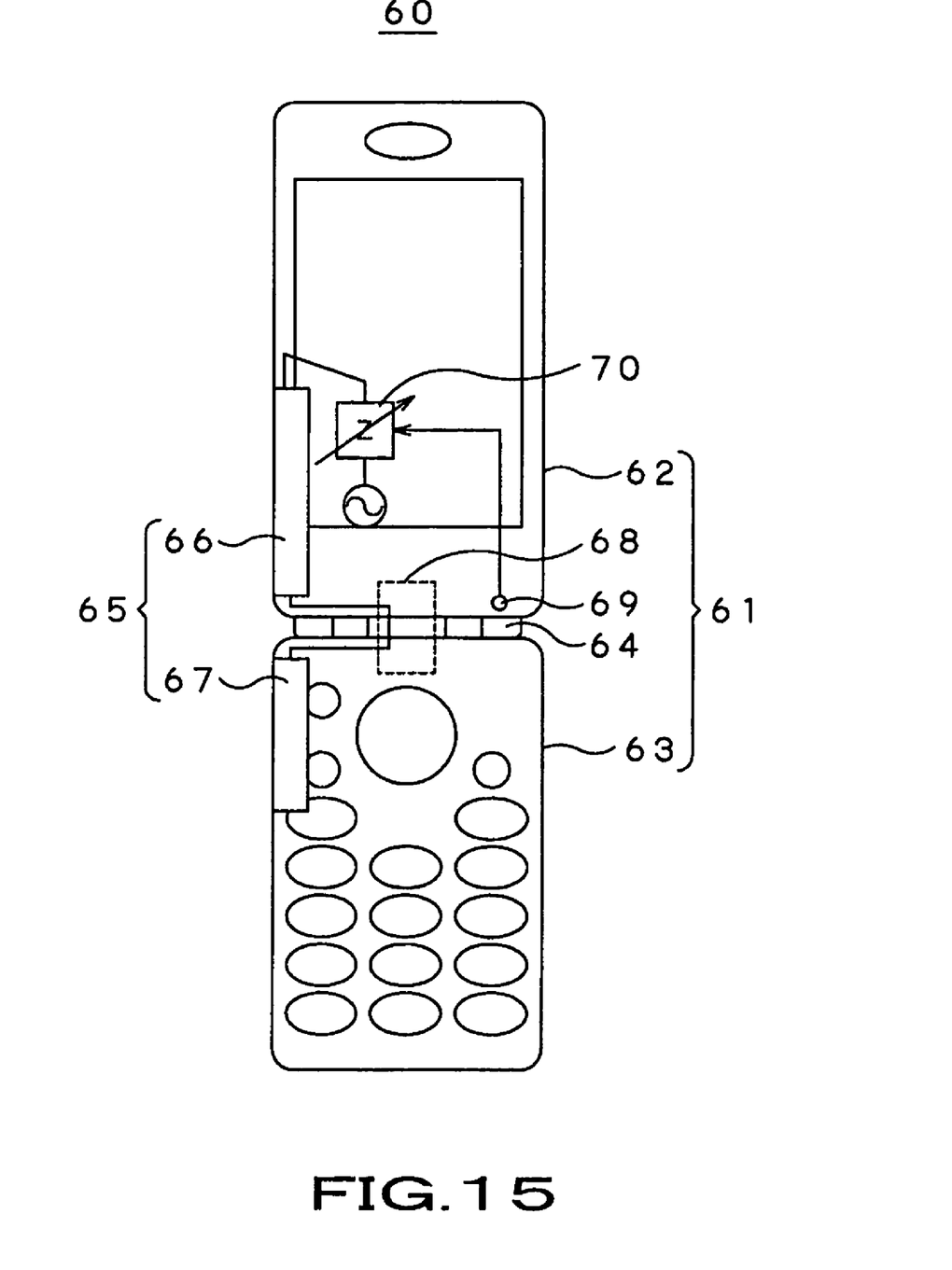
FIG. 15 is a schematic plan view of the fourth embodiment of FIG. 14 in a state where the cabinet is unfolded.

FIGS. 14 and 15 schematically illustrate the fourth embodiment of the present invention, which is a portable telephone set 60. The portable telephone set 60 includes a cabinet 61 that includes a first cabinet 62 and a second cabinet 63 connected to each other by means of a hinge mechanism 64 in such a way that the two cabinets are foldable relative to each other so as to show a change in the profile from a first cabinet profile where the second cabinet 63 is folded onto the first cabinet 62 to a second cabinet profile where the second cabinet 63 is unfolded from the first cabinet 62 or the other way round. The antenna element 65 of the portable telephone set 60 includes a first antenna element 66 that is contained in the first cabinet 62 and a second antenna element 67 that is contained in the second cabinet 63.

The portable telephone set 60 additionally includes a flexible print connector 68 that extends over the hinge mechanism 64 to electrically connect the components in the first cabinet 62 and those in the second cabinet 63. Thus, the first antenna element 66 and the second antenna element 67 of the portable telephone set 60 are electrically integrated to operate as antenna element 65 by way of the flexible print connector 68.

The portable telephone set 60 includes a cabinet profile detecting section 69 for detecting a change in the profile of the cabinet 61 between the first cabinet profile and the second cabinet profile and a characteristics switching circuit section 70. Thus, in the portable telephone set 60, the cabinet profile detecting section 69 detects either the first cabinet profile or the second cabinet profile of the cabinet 61 and outputs a first detection signal or a second detection signal, whichever appropriate. Then, in the portable telephone set 60, the characteristics switching circuit section 70 operates to switch from the first antenna characteristic values to the second antenna characteristic values or the other way round according to the first detection signal or the second detection signal so that the portable telephone set 60 may operate with the most efficient antenna characteristics.

Meanwhile, as described above, the first antenna element 66 of the portable telephone set 60 includes a first antenna element 66 that is contained in the first cabinet 62 and a second antenna element 67 that is contained in the second cabinet 63 so as to constitute the antenna element 65. Thus, in the portable telephone set 60, the antenna element 65 changes its profile from a first antenna profile where the first antenna element 66 and the second antenna element 67 are laid one on the other to a second antenna profile where the first antenna element 66 and the second antenna element 67 are longitudinally located side by side or the other way round according to the change in the profile of the cabinet 61. Thus, the change in the profile of the antenna element 65 is interlocked with the change in the profile of the cabinet 61. In other words, unlike the antenna element of the portable telephone set 1 and that of the portable telephone set 50, the antenna element 65 of this embodiment does not change its profile by itself.

Therefore, the cabinet profile detecting section 69 of the portable telephone set 60 that detects a change in the profile of the cabinet 61 also automatically detects a change in the profile of the antenna element 65. In the portable telephone set 60, the characteristics switching circuit section 70 operates to switch from the first antenna characteristic values to the second antenna characteristic values or the other way round according to the detection signal output from the cabinet profile detecting section 69. The operation of the characteristics switching circuit 70 includes that of correcting the antenna characteristic values in response to a change in the profile of the cabinet 61 and that of correcting the antenna characteristic values in response to a change in the profile of the antenna element 65.

The present invention is not limited to the above-described embodiments of the portable telephone set and can also be applied to portable television receiving sets, portable information terminal apparatus and other various wireless communication apparatus. Furthermore, the present invention is applicable not only to portable wireless communication apparatus but also to stationary wireless communication apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus comprising: a profile changeable cabinet changeable from a first cabinet profile to a second cabinet profile;
   a profile changeable antenna element arranged in the profile changeable cabinet and changeable from a first antenna profile to a second antenna profile;
   switching circuit section for selecting one or more of a plurality of impedance altering circuits; and
   cabinet/antenna profile detection means for detecting a current profile of the antenna element and the cabinet and outputting a detection signal for driving the switching circuit section, wherein the switching circuit section selects from among four impedance altering circuit configurations corresponding to each of the four possible combinations of cabinet and antenna profiles.

2. A wireless communication apparatus comprising:
   a profile changeable antenna element changeable from a first antenna profile to a second antenna profile;
   a profile changeable cabinet changeable from a first cabinet profile to a second cabinet profile;
   switching circuit section for selecting one or more of a plurality of impedance altering circuits; and
   cabinet/antenna profile detection means for detecting a current profile of the antenna element and the cabinet and outputting a detection signal for driving the switching circuit section, wherein the switching circuit section selects from among four impedance altering circuit configurations corresponding to each of the four possible combinations of cabinet and antenna profiles.

3. The apparatus according to claim 2, wherein the switching circuit section is an impedance matching switching circuit for selecting an input impedance for the antenna element.

4. The apparatus according to claim 2, wherein the antenna element is adapted to change its profile from a first antenna profile of standing upright relative to the cabinet to a second antenna profile of lying in parallel with a lateral surface of the cabinet and vice versa.

* * * * *